United States Patent
Kim

(10) Patent No.: US 6,207,214 B1
(45) Date of Patent: Mar. 27, 2001

(54) METHOD AND APPARATUS FOR MANUFACTURING KOREAN TRADITIONAL OIL PASTRIES

(76) Inventor: Sang Kuen Kim, 319-10 Hapchun-ri, Hapchun-up, Hapchun-Jun, Kyungsangnam-do (KR)

( * ) Notice: Subject to any disclaimer, the term of this patent is extended or adjusted under 35 U.S.C. 154(b) by 0 days.

(21) Appl. No.: 09/447,258

(22) Filed: Nov. 23, 1999

(30) Foreign Application Priority Data

May 20, 1999 (KR) .................................................. 99-18304

(51) Int. Cl.[7] .................................. A23L 1/00; A23P 1/00
(52) U.S. Cl. ..................... 426/516; 99/484; 99/536; 425/204; 425/308; 426/506; 426/438
(58) Field of Search .................... 426/516, 496, 426/506, 518, 438; 425/204, 308; 99/484, 536; 366/85

(56) References Cited

U.S. PATENT DOCUMENTS

| 5,119,721 | * | 6/1992 | Satake et al. ........................... 99/536 |
| 5,417,992 | * | 5/1995 | Rizvi et al. ............................ 426/516 |
| 5,914,148 | * | 6/1999 | Kazemzadeh ........................ 426/516 |
| 5,932,264 | * | 8/1999 | Hurd et al. ............................ 426/516 |

* cited by examiner

*Primary Examiner*—George C. Yeung
(74) *Attorney, Agent, or Firm*—Birch, Stewart, Kolasch & Birch, LLP

(57) ABSTRACT

An apparatus includes an extruder having mixing screws, a speed reduces, a plurality of barrels, an extrusion die, feed hoppers, a water supply hose, and a $CO_2$ gas supply member, and a conveyer unit having a conveyer belt, a flour distributor, a plurality of heaters and a cutter for manufacturing Korean traditional oil pastries in mass production by means of the apparatus.

6 Claims, 9 Drawing Sheets

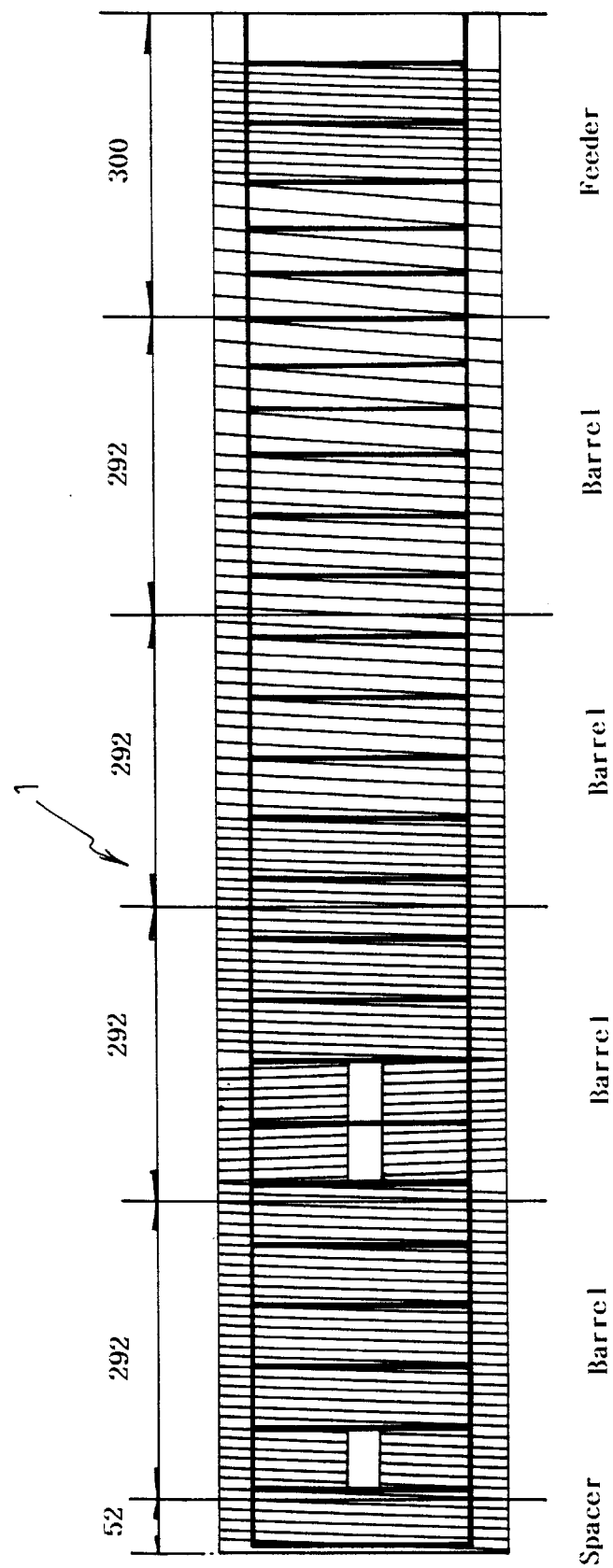

METHOD AND APPARATUS FOR MANUFACTURING KOREAN TRADITIONAL OIL PASTRIES

BACKGROUND OF THE INVENTION

1. Field of the Invention

The present invention relates to a method and apparatus for manufacturing pastries and, more particularly, to a method and apparatus for manufacturing Korean traditional oil pastries, mechanized by means of an extruder and a conveyor unit and thus being suitable for mass production of such pastries.

2. Description of the Related Art

As well known to those skilled in the art, Korean traditional oil pastries are produced by frying uncoated, sized pieces made of a main material of glutinous rice, the pastries having unique texture and taste. In a more detailed description, the pastries are produced by immersing glutinous rice in water to moisturize the rice, grinding the moisturized glutinous rice, mixing the ground glutinous rice with sub-materials to prepare mixed materials, and kneading, steaming, aerating and drying the materials prior to forming the uncoated and sized pieces. Thereafter, the pieces are fried and coated with a coating material, such as popped rice.

Such a conventional pastries are generally used for ceremonial occasions in the past, whereas the pastries are now normally used as gifts and snack foods in Korea and occasionally eaten by foreigners.

The conventional method of manufacturing Korean traditional oil pastries consists of a gelatinization step, an immersing step, a grinding step, a water content regulation step, a steaming step, and an aeration step. The aeration step is to uniformly distribute air in a steamed dough by beating the dough so as to destroy the texture of gelatinized dough. Such a conventional method of manufacturing Korean traditional oil pastries suffers from a number of problems as follows.

In such a conventional method, the aeration step has to be manually carried out by hand, that is, by beating the dough with a wooden roller by hand, and reiterated several tens of times. Since the aeration step has to be manually performed, the yield depends on the worker's individual ability and even a skilled worker may not produce a large yield in a short period.

After the aeration step is completed, the aerated dough is spread on a wheat flour covered floor and cut into uncoated and sized pieces. The pieces are dried on the hot floor for a day and fried in oil to be swelled. To be swelled means that the volumes of the individual pieces are enlarged because flexible starchy membranes become porous structures.

The enlargement of the volume is due to the facts that expansion of air and expansive pressure resulting from vaporization of water occur and simultaneously hydrogen bonds are broken between amylopectin chains. The softness of the pastries depends on the swelling. Such a conventional method is also problematic in that the degree of swelling depends on weather and worker's skill.

SUMMARY OF THE INVENTION

Accordingly, it is an object of the present invention to provide a method and apparatus for manufacturing Korean traditional oil pastries, which eliminates the above problems encountered with conventional methods and apparatuses for Korean traditional oil pastries.

Another object of the present invention is to provide a method and apparatus for manufacturing Korean traditional oil pastries, which is suitable for mass production of Korean oil pastries, thus reducing the production time and the production cost, sanitizing the production process, and improving the quality of products.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a schematic diagram showing an arrangement of extruding screws included in the extruder of the present invention;

DESCRIPTION OF THE PREFERRED EMBODIMENTS

Figure 1:
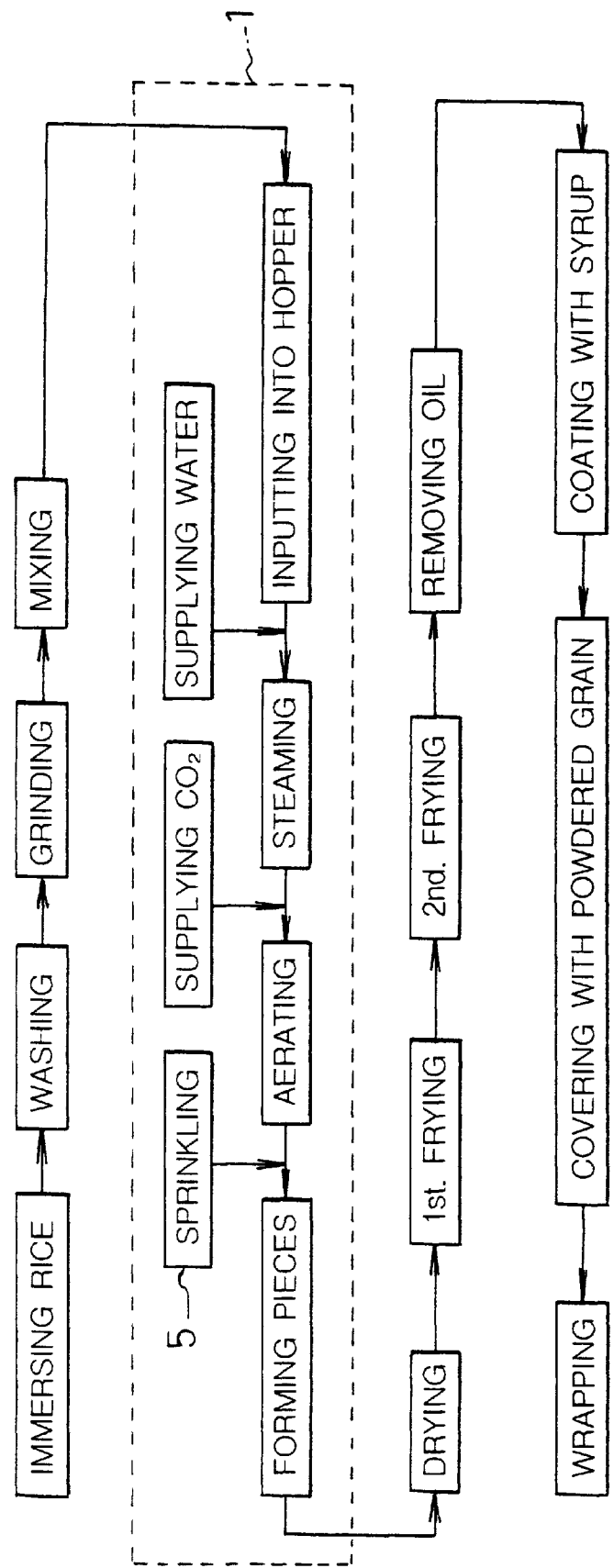
FIG. 1 is a flow diagram showing a method of manufacturing Korean traditional oil pastries according to the preferred embodiment of the present invention.
Figure 2:
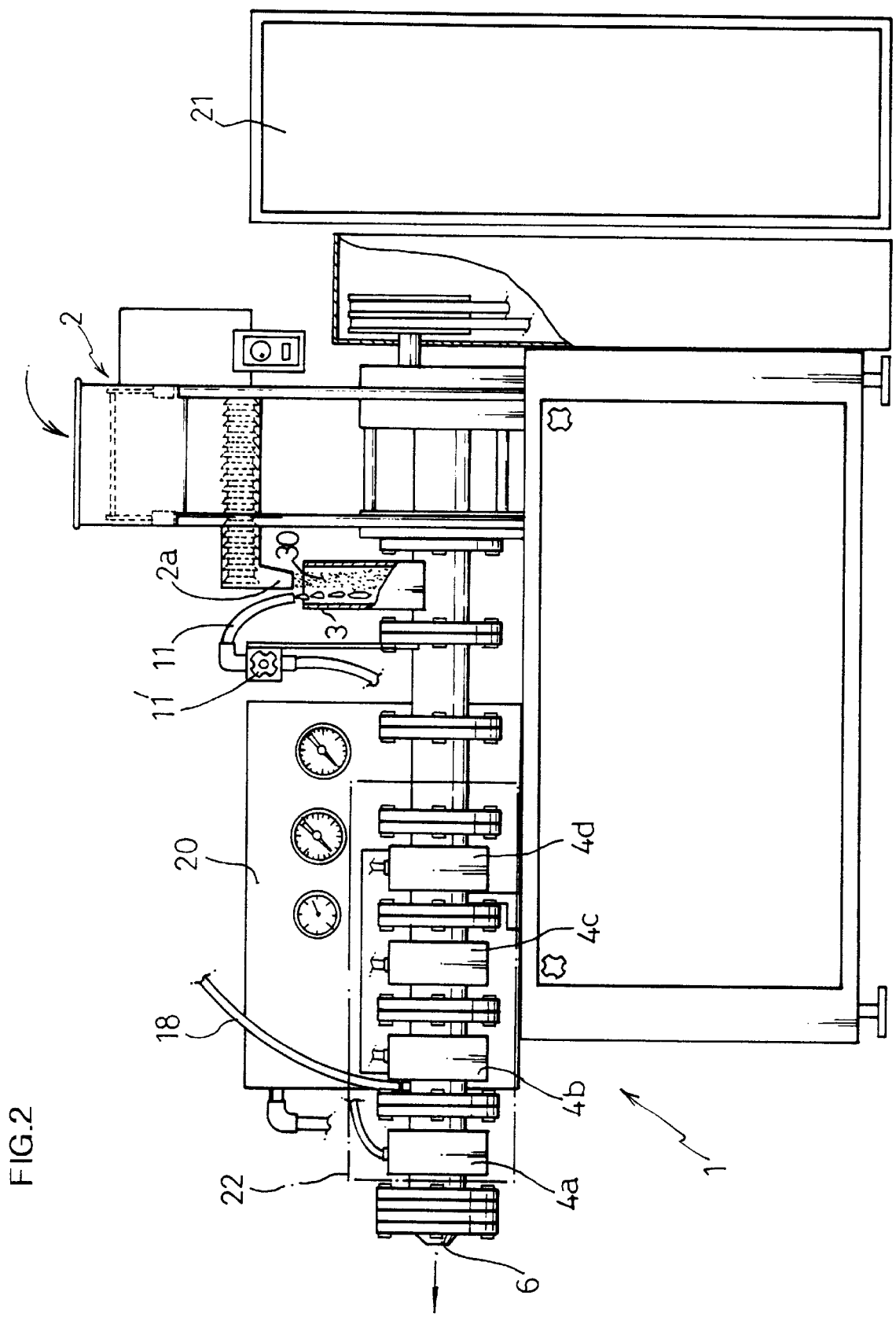
FIG. 2 is a side view of the present invention containing cut-away portions showing the construction of an extruder used for kneading mixture, steaming dough, and aerating the dough in the method of the present invention.

A method and apparatus for manufacturing Korean traditional oil pastries according to the preferred embodiment of the present invention will be described in the following.

The method of the present invention comprises the following five steps.

First Step: Process of Immersing and Grinding Glutinous Rice 160 kg of glutinous rice is immersed in subterranean water for 3 days. The glutinous rice is washed 2–3 times using flowing water. Afterward, water is partially removed from the glutinous rice to obtain 45–55 wt % of the water content of the glutinous rice. The glutinous rice is ground using a grinder, such as a roller mill, to obtain 80 mesh granules.

Second Step: Process of Mixing

According to the first modification of the preferred embodiment of the second step, the ground glutinous rice is mixed at the amount of 70–80 wt % with 10–15 wt % of bean flour, 10–15 wt % of powdered ginseng, 0.01 wt % of sugar, and 0.001 wt % of salt by hand, thus forming a mixture. The above mixture is, thereafter, added with 1200–2000 cc of bean juice, 1200–2000 cc of distilled liquor (preferably, soju-Korean traditional distilled liquor), and 10 cc of edible oil. In such a case, the amounts of bean juice, distilled liquor, and edible oil are set on the basis of the amount of 8 kg of the ground glutinous rice to make a mixture 30.

According to the second modification of the embodiment of the second step, the ground glutinous rice is mixed at the amount of 80–95 wt % with 0.01 wt % of sugar, 0.001 wt % of salt, and at least one selected from a group consisting of 5–20 wt % of powdered mugwort, 5–20 wt % of powdered green tea, 5–20 wt % of powdered polygonatum, and 5–20 wt % of powdered citron, thus forming a mixture. This is followed by the same procedure as that described in the first modification. In such a case, the amounts of bean juice, distilled liquor, and edible oil are also set in the same manner as that described for the first modification.

According to the third modification of the embodiment of the second step, the ground glutinous rice is mixed at the amount of 80–90 wt % with 5–10 wt % of powdered prawns, 5–10 wt % of powdered red pepper, 0.01 wt % of sugar, and 0.001 wt % of salt. This is followed by the same procedure as that in the first modification. In such a case, the amounts of bean juice, distilled liquor, and edible oil are also set in the same manner as that described for the first modification. The resulting pastries of this modification are suitable for being used as beer snacks.

Third Step: Process of Steaming and Aerating

The mixture 30 obtained in the second step is input into a feed hopper 2 of an extruder 1. When a feed hopper screw 2b of the extruder 1 is operated, the feed hopper screw 2b forcibly moves the mixture 30 into a feed hopper outlet 2a of the extruder 1. The mixture 30, discharged from the feed hopper outlet 2a together with water supplied from a water supply hose 11, is input into a mixing hopper 3 of the extruder 1. The mixture 30 is, thereafter, kneaded, steamed, and aerated in a plurality of barrels 4a, 4b, 4c and 4d while being moved from the mixing hopper 3 to a extrusion die 6 of the extruder 1, and is finally extruded from the die 6, thus being formed into an uncoated food bar 31.

More precisely, the mixture 30, introduced into the mixing hopper 3, is kneaded with water so as to form a dough while being moved toward the extrusion die 6 by a mixing screw 1' of the extruder 1. The dough is steamed in the plurality of regularly spaced barrels 4a, 4b, 4c and 4d positioned around the mixing screw 1' as shown in FIG. 7. The interior temperature of the barrels 4a to 4d is heated to 105° C. by a heater disposed within the control panel 20. The dough is aerated with $CO_2$ gas supplied from a gas inlet 18 connected between the barrels 4a and 4b with the pressure of the gas being at 0.5–5 MPa. As a result of the aeration, the dough becomes porous. Finally, the porous dough is formed into the uncoated food bar 31 while passing through the extrusion die 6.

Fourth Step: Process of Forming Pieces From the Bar and Drying the Pieces

When the uncoated food bar 31, continuously extruded from the extrusion die 6 without being cut, is positioned on the front end of a conveyor unit 8, the food bar 31 is sprinkled with flour 40 supplied from a flour distributor 5. The bar 31, sprinkled with flour 40, is heated by a plurality of heaters 9 arranged along the conveyor unit 8 while being moved by a conveyor belt 8' of the conveyer unit 8. When the food bar 31 reaches the rear end of the conveyor unit 8, the food bar 31 is cut into a plurality of uncoated, and sized pieces 32, 3–4 cm in length by a cutter 10 positioned at the rear end of the conveyor unit 8. The cut pieces 32 are dried in a drier (not shown) for 4–6 hours.

Fifth Step: Process of Swelling

The dried uncoated, and sized pieces 32 from the fourth step are firstly fried in oil at a temperature of 110–120° C. for 1–2 minutes, thus being primarily swelled. The firstly fried pieces are again fried in oil at a temperature of 160–180° C. for 2–4 minutes, thus being secondarily swelled. Thereafter, oil is forcibly removed from the fried pieces for 1–2 minutes.

Alternatively, one full day is required to appropriately remove oil from the fried pieces under the natural conditions. The oil-removed pieces are coated with grain syrup. Finally, the grain syrup-coated pieces are covered with at least one selected from a group consisting of perilla seeds, black sesame seeds, sesame seeds, ground pine-nuts, pine pollen, powdered sea lettuce, powdered prawns, and popped rice, thus producing desired pastries of the present invention.

In the above method, the steps of kneading, steaming, aerating, covering, cutting and etc. for manufacturing the pastries may be performed by one system consisting of the extruder 1 and the conveyor unit 8. Therefore, a large amount of uncoated and sized pieces 32 may be manufactured within a short time, thereby conserving time while producing such pastries.

The extruder, used for manufacturing the pastries, comprises two rows of screws 1' having different spiral angles, thereby extruding the dough onto an uncoated food bar 31. Multiple barrels 4a, 4b, 4c and 4d are arranged around the screws 1' as shown in FIG. 7. The extrusion die 6 is mounted at the rear end of the extruder 1. The $CO_2$ gas conduit 18, the water hose 11, the heater, and a pressure gauge pass through the $CO_2$ gas control panel 20, and the $CO_2$ gas control panel 20 is connected to the barrels 4a, 4b, 4c, and 4d. The processes of the present invention are regulated using the $CO_2$ gas control panel 20.

The feed hopper 2 and the mixing hopper 3 are positioned above the front end of the screws. The mixing hopper 3 is positioned under the feed hopper outlet 2a, thus receiving the mixture 30 from the feed hopper 2. The water supply hose 11, connected to the $CO_2$ gas control panel 20, is positioned over the mixing hopper 3 to supply water into the mixing hopper 3 at its end. The screws 1' are connected to a speed reducer 12 which is operated in conjunction with a drive motor (not shown).

Figure 4:
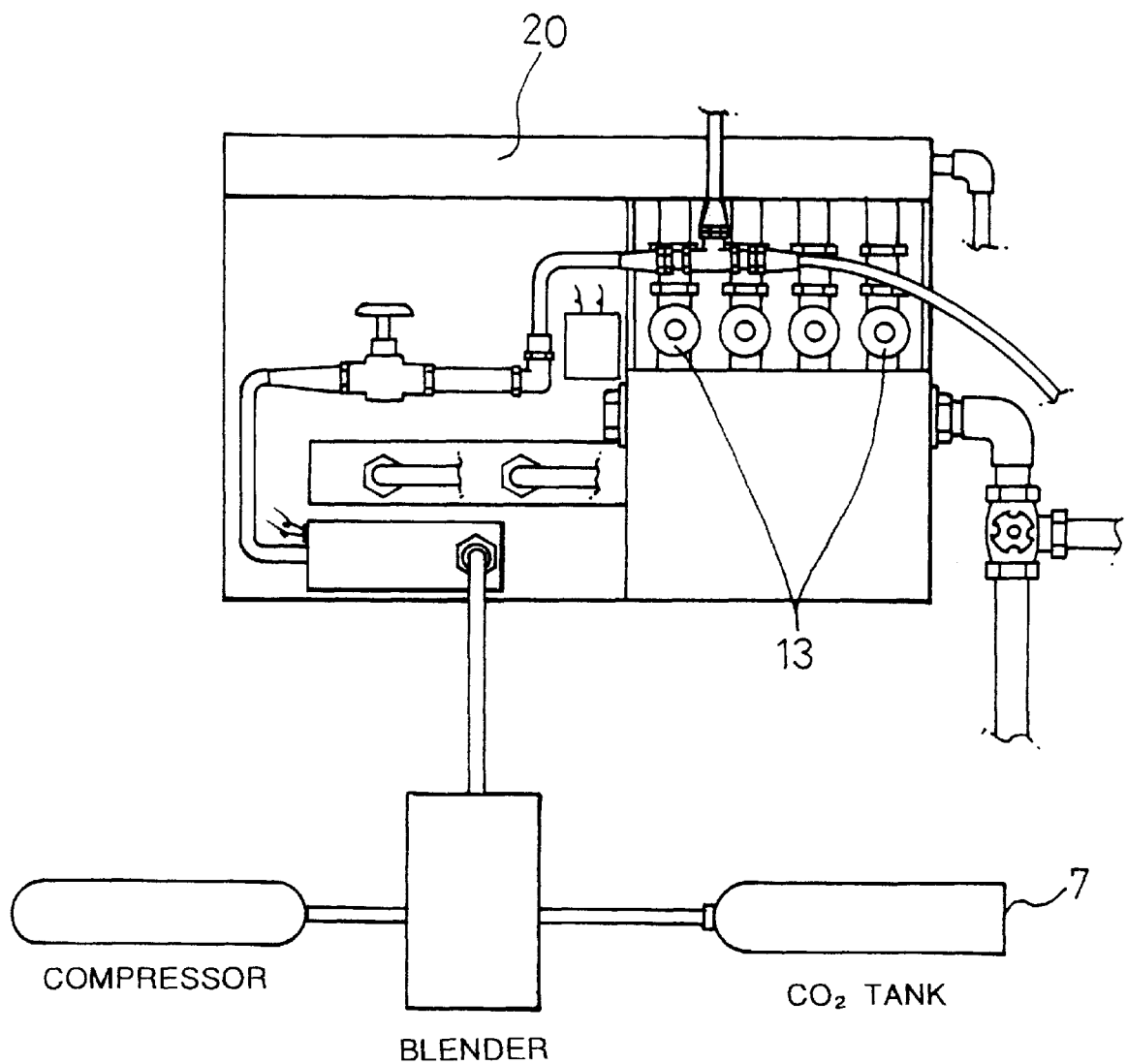
FIG. 4 is a view showing a $CO_2$ gas control panel used for aerating the dough in the method of the present invention.
Figure 5:
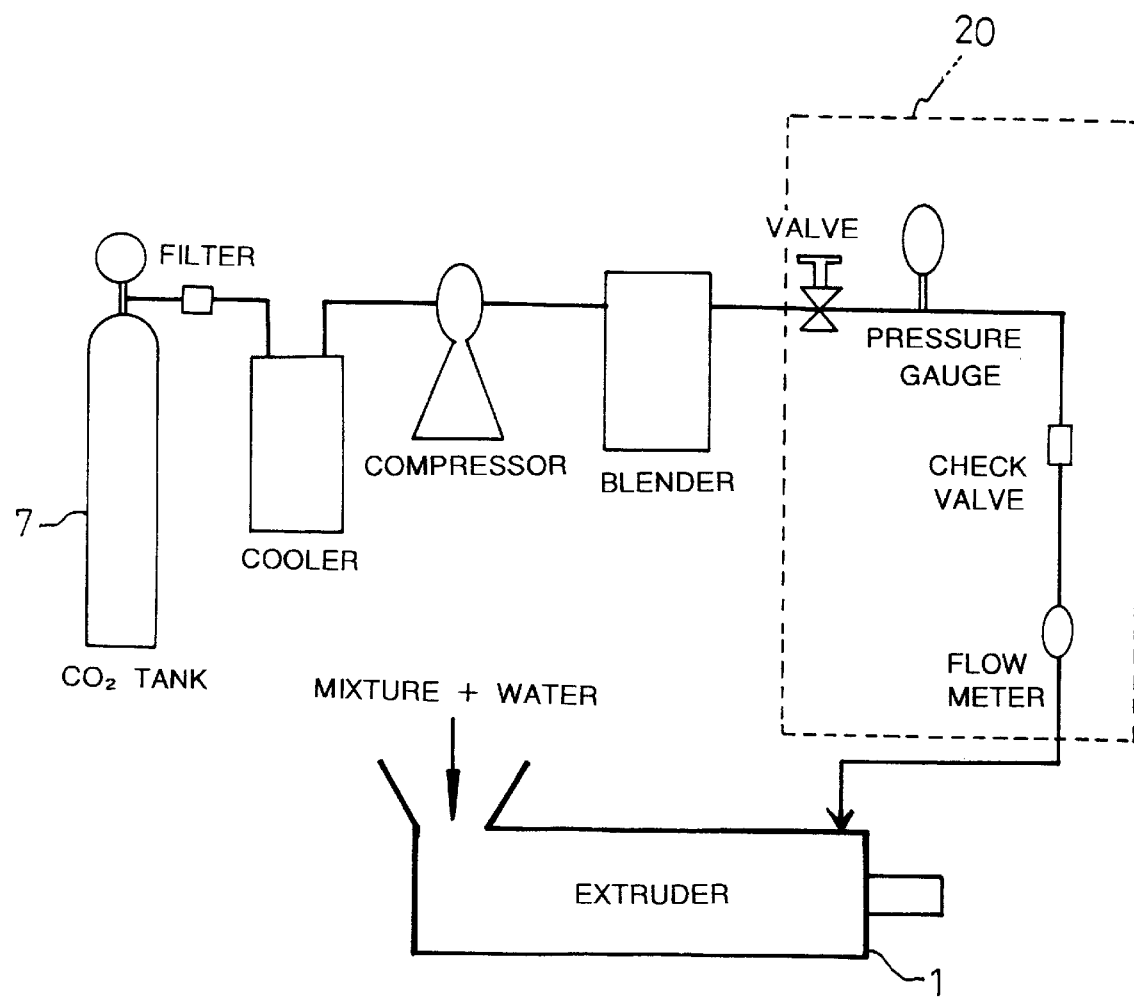
FIG. 5 is a diagram showing the construction of a $CO_2$ supply unit used for supplying $CO_2$ gas in the method of the present invention.

As shown in FIGS. 4 and 5, a $CO_2$ gas supply unit 50 is connected to the extruder 1. In the $CO_2$ gas supply unit 50, a $CO_2$ gas tank 7, a cooler 51, a compressor 52, a blender 53, a gas valve 54, a pressure gauge 55, a check valve 13 and a flow meter 56 are arranged in order. Of the $CO_2$ gas supply unit, the gas valve 54, the pressure gauge 55, the check valve 13, and the flow meter 56 are arranged on the $CO_2$ gas control panel 20.

Figure 6A:
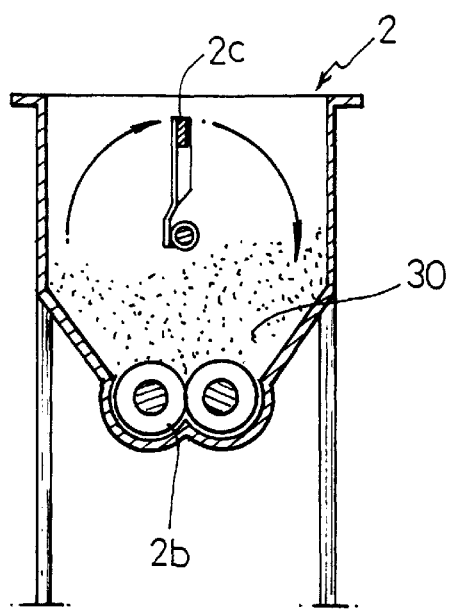
FIG. 6a is a cross sectional view showing a feed hopper of the extruder of the present invention.
Figure 6B:
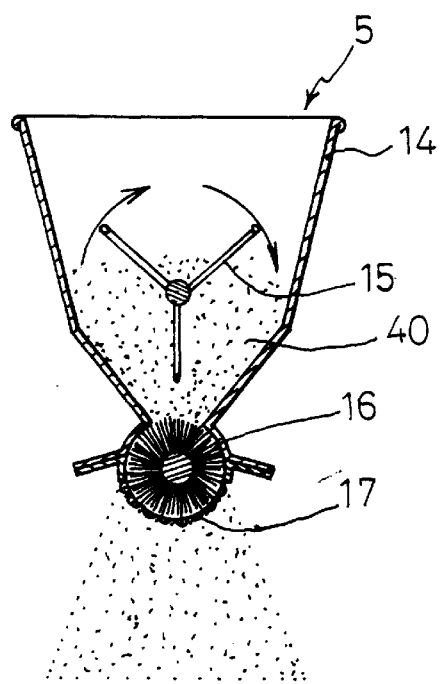
FIG. 6b is a cross sectional view showing a flour distributor of the conveyor unit of the present invention.

The flour distributor 5 are positioned over the front end of the conveyor unit 8. As shown in FIG. 6b, the flour distributor 5 comprises a distributing hopper 14, an agitator 15, a roll brush 16, and a lower net 17. When the agitator 15 is rotated, the flour 40 in the distributing hopper 14 falls through the roll brush 16 and the lower net 17, thus sprinkling the uncoated food bar 31 with the flour 40.

Figure 3:
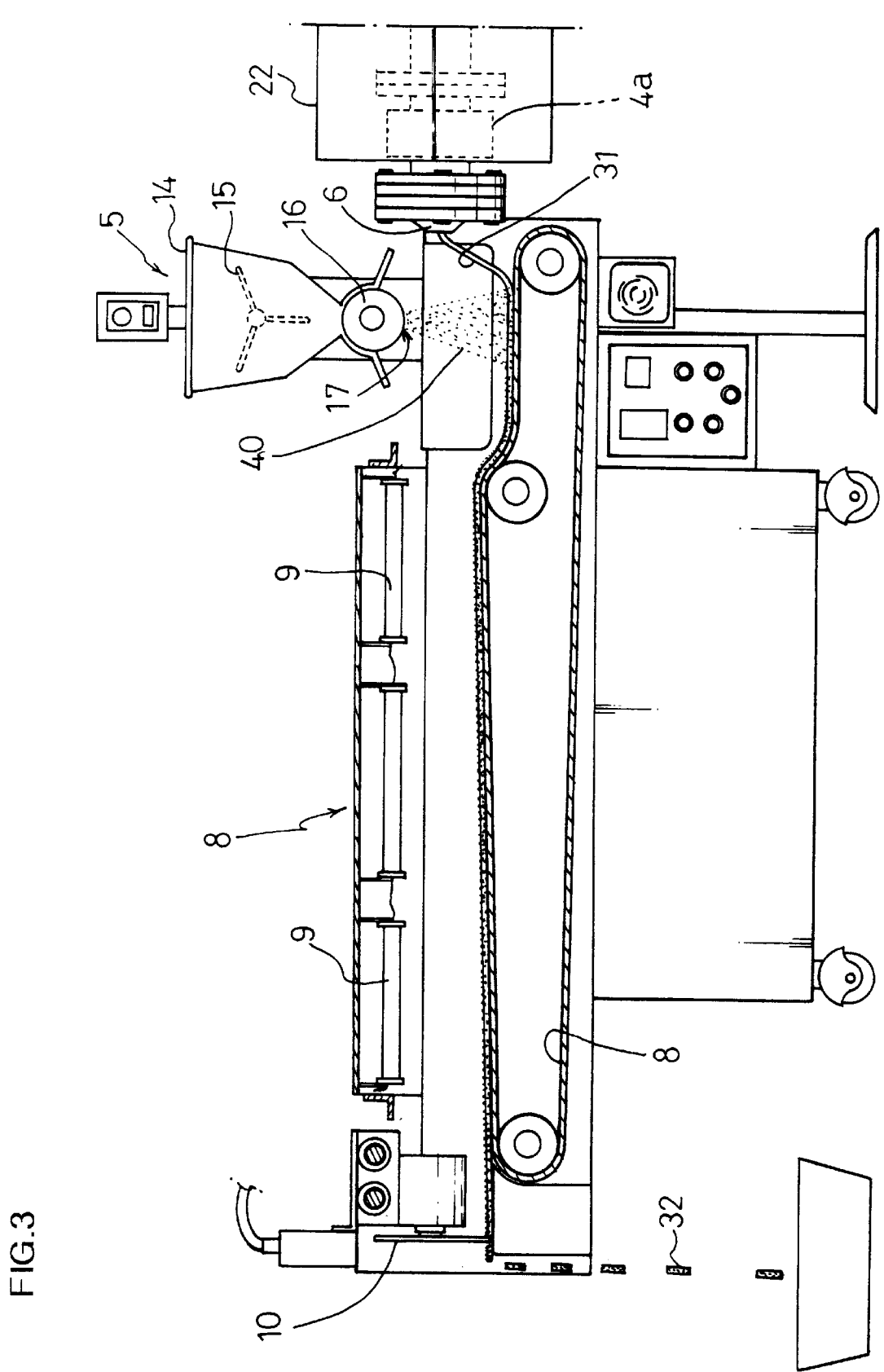
FIG. 3 is a side view showing a conveyor unit used in the method of the present invention.

As shown in FIG. 3, the conveyor unit 8 has a conveyor belt 8'. The heaters 9 are arranged along the conveyer unit 8. The cutter 10 is positioned at the rear end of the conveyor unit 8. Pursuant to the construction consisting of the conveyor unit 8 and the cutter 10, the food bar 31 extruded by the extruder 1 and sprinkled with flour is heated by heaters 9 while being moved by the conveyor belt 8'. The food bar 31 is cut into the plurality of uncoated and sized pieces 32 by the cutter 10 at the rear end of the conveyor unit 8. Reference numerals 21 and 22 designate a power control box and a barrel cover, respectively.

Hereinafter, the method and apparatus of the present invention will be described in more detail. 160 kg of glutinous rice is immersed in subterranean water for 3 days. The glutinous rice is washed 2–3 times using flowing water. Afterward, water is partially removed from the glutinous rice to obtain 45–55 wt % of the water content of the glutinous rice. In such a case, the water content of the glutinous rice is controlled at 150° C./35 min by using a known infrared water content measuring instrument. The glutinous rice is ground using the roller mill, to obtain 80 mesh granules.

8 kg of the ground glutinous rice is mixed at the amount of 70–80 wt % with 10–15 wt % of bean flour, 10–15 wt % of ginseng powder, 0.01 wt % of sugar, and 0.001 wt % of salt by hand, thus forming a mixture. The above mixture is, thereafter, added with 1200–2000 cc of bean juice, 1200–2000 cc of distilled liquor, preferably, soju-Korean traditional distilled liquor, and 10 cc of edible oil. In such a case, the amounts of bean juice, distilled liquor, and edible oil are set on the basis of the amount of 8 kg of the ground glutinous rice to make the mixture 30.

The mixture 30 is input into the feed hopper 2 of the extruder 1. When the power switch (not shown) of the power control box 21 is turned on, the drive motor is operated, thus rotating the feed hopper screw 2b and the mixing screws through the speed reducer 12. Therefore, the mixture 30 is moved to the feed hopper outlet 2a of the extruder 1 by the feed hopper screw 2b. The mixture 30 thus falls onto the mixing screws 1' from the feed hopper outlet 2a.

In such a case, the mixture 30 along with the proper amount of water is supplied onto the mixing screws since the water supply tube 11 is positioned over the mixing hopper 3 at its end with a water valve 11' mounted on the water supply hose 11. Incidentally, as shown in FIG. 6a, a feed agitator 2c is mounted in the feed hopper 2 to agitate the mixture 30, while feed hopper screws 2b are positioned in the bottom of the feed hopper 2 to make the mixture 30 get out of the feed hopper 2.

The mixture 30 is kneaded, steamed and aerated while being moved along the mixing screws, thereby forming the uncoated food bar 31. When the mixing screws are rotated at a speed of 140 rpm with the interior of the barrels 4a, 4b, 4c, and 4d maintained at a temperature of 105° C., the mixture 30 becomes steamed dough in the barrels 4a, 4b, 4c, and 4d.

The $CO_2$ gas is introduced into the space around the mixing screws 1' through the gas inlet 18 while the mixture 30 is being kneaded and the dough is being steamed. The $CO_2$ gas is supplied to the dough through the $CO_2$ gas tank 7, the cooler 51, the compressor 52, the blender 53, the gas valve 54, the pressure gauge 55, the check valve 13, and the flow meter 56.

When the $CO_2$ gas reaches the dough, the dough is aerated with $CO_2$ gas, and so the dough becomes porous. The mixing screws 1' are arranged in two rows, the diameter of each of the mixing screws 1' is 50.3 mm, L/D (Length/Diameter) ratio of each of the mixing screws 1' is 20, the motor capacity to drive the mixing screws 1' is 30 HP, and the extrusion die is a circular type one having a diameter of 4 mm.

The type of each of the mixing screws 1' is a high-shear screw, and reverse directional screws are interposed in the middle of the mixing screws 1' to prevent $CO_2$ gas from flowing backward to the mixing hopper 3. The $CO_2$ gas is supplied through the gas inlet 18 connected to a position between the barrels 4a and 4b at its end, and the pressure of $CO_2$ gas is regulated to 0.5 MPa–5 MPa by controlling the gas valve on the $CO_2$ gas control panel 20 while observing the pressure on the pressure gauge 55. The steamed and aerated porous dough is formed to the uncoated food bar 31 while passing the extrusion die 6.

When the uncoated food bar 31 formed continuously is positioned on the front end of the conveyor unit 8, the food bar 31 is moved toward the rear end of the conveyor unit 8 by means of the belt 8'. The food bar 31 is sprinkled with flour supplied from the flour distributor 5. The flour distributor 5 is positioned over the front end of the conveyor unit 8.

The flour distributor 5 comprises a distributing hopper 14, an agitator 15, a roll brush 16, and a lower net 17. When the food bar 31 is positioned on the front end of the conveyor unit 8, the flour 40 in the distributing hopper 14 passes through the roll brush 16 and the lower net 17 on the bar 31, thereby sprinkling the uncoated bar 31 with flour. Since the agitator 15 is mounted in the distributing hopper 14, the flour 40 in the distributing hopper 14 is stirred not to be conglomerated.

The food bar 31 sprinkled with flour is partially dried by heaters 9 arranged along the conveyer unit 8 while being moved by the conveyor belt 8', thereby being hardened at its outside surface to be easily cut at the next cutting step. When the food bar 31 is conveyed onto the rear end of the conveyor unit 8, the bar 31 is cut into a plurality of uncoated, sized pieces 32, 3–4 cm in length by the cutter 10 positioned at the rear end of the conveyor unit 8. The sizes of the uncoated and sized pieces 32 are freely set by controlling the speed of the cutter 10.

After the uncoated and sized pieces 32 are cut, the cut uncoated and sized pieces are dried in the drier for 4–6 hours. The dried uncoated, sized pieces 32 are firstly fried at a temperature of 110–120° C. for 1–2 minutes. The firstly fried pieces 32 are again fried at the temperature of 160–180° C. for 2–4 minutes, to be swelled.

After the two frying steps, oil is removed from the dried pieces 32 by the oil remover (not shown) for 1–2 minutes. The oil-removed pieces are coated with grain syrup and, thereafter, are covered with at least one selected from a group consisting of perilla seeds, black sesame seeds, sesame seeds, ground pine-nuts, pine pollen, powdered sea lettuce, powdered prawns, and popped rice.

The present invention is to provide the method and apparatus for allowing a manufacture of the Korean traditional oil pastries to be mechanized while maintaining the unique taste of the Korean traditional pastries.

Figure 8A:
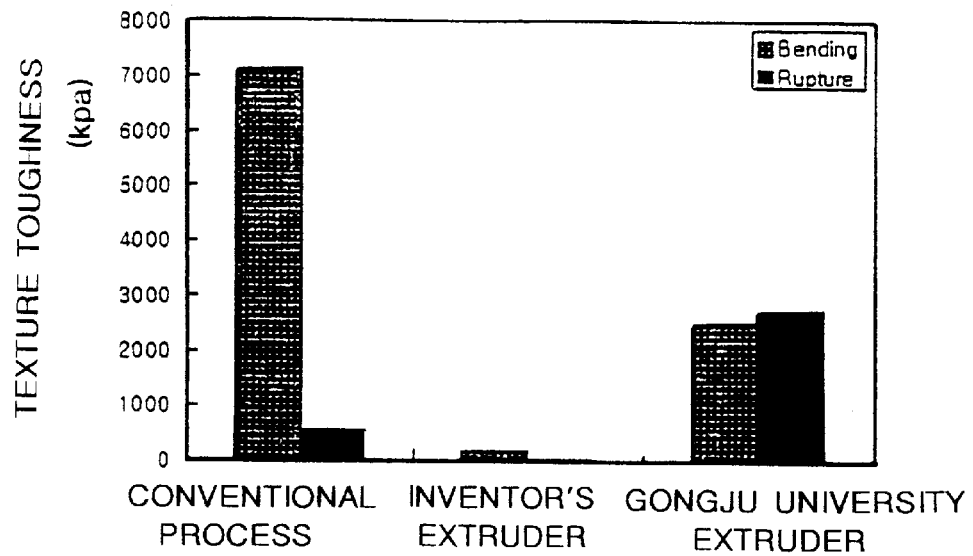
FIG. 8a is a graph showing the texture toughnesses of pastries produced through the conventional method and the method of the present invention.
Figure 8B:
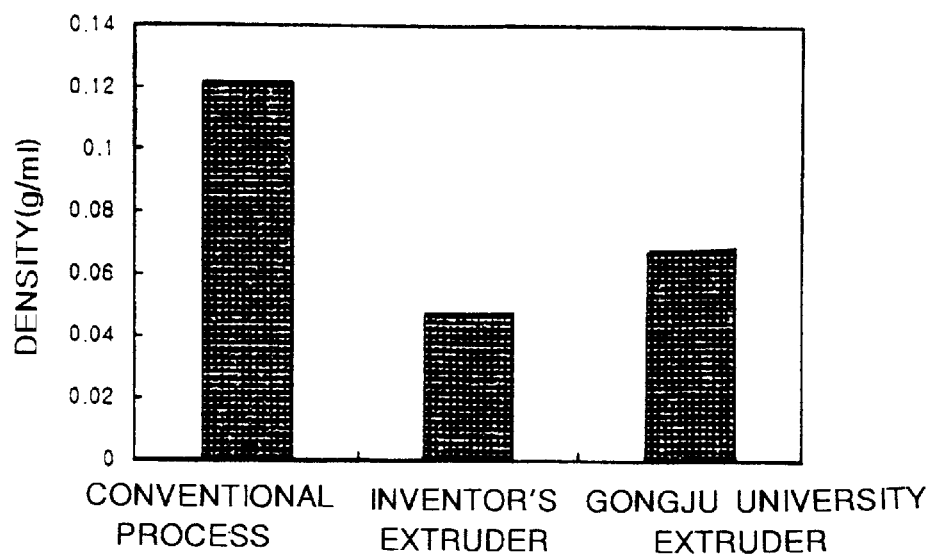
FIG. 8b is a graph showing the densities of pastries produced through the conventional method and the method of the present invention.

Four tests were performed to measure the effects of the present invention, and the testing results will be described as follows. In the first and second tests, as shown in FIGS. 8a and 8b, a uncoated and sized pieces made by the conventional manufacturing method were compared with the uncoated and sized pieces 32 made by the method and extruders of the present invention. In such a case, two extruders of this invention were used by two parties to separately manufacture the pastries.

That is, one extruder of the present invention was used by Gongju University in Korea and the other extruder 1 is used by the inventor of the present invention. The extrusion temperature in the two extruders was maintained at 105° C., with the rotational speed of the extruder screws maintained at 250 rpm for Gongju University extruder and at 140 rpm for the inventor's extruder 1.

As a result of the first test, the average texture toughness of the pieces was 7,094 kPa for the pieces made by the conventional method, whereas the average texture toughness of the pieces was 2,496 kPa for the pieces made by the Gongju University extruder and 172 kPa for the pieces 32 made by the inventor's extruderl.

Therefore, the average texture toughness of the pieces made by the conventional method was substantially lower than the average texture toughnesses of the pieces 32 made by the present invention. The comparison results are shown in the graph of FIG. 8a.

As a result of the second test, the average density of the pieces was 0.12 g/ml for the pieces made by the conventional method, whereas the average density of the pieces was 0.07 g/ml for the pieces made by the Gongju University extruder and 0.05 g/ml for the pieces 32 made by the inventor's extruder 1.

Accordingly, the average densities of the pieces according to the present invention were substantially lower than the average density of the pieces made by the conventional method. The comparison results are shown in the graph of FIG. 8b.

The objective of the third and fourth tests(FIGS. 9a and 9b) was to measure the influence exerted by the rotational speed of the extruder screws.

The third test for analyzing the influence on the texture toughness exerted by the rotational speed of the extruder screws was performed as follows. In this test, the extruder screws were rotated at 100 rpm, 140 rpm, or 180 rpm while maintaining the interior temperature of the extruder at a constant point. The texture toughness was 291 kPa for the rotational speed of 100 rpm, 172 kPa for the rotational speed of 140 rpm, and 262 kPa for the rotational speed of 180 rpm. In such a case, the texture toughness was the lowest when the rotational speed was 140 rpm according to the present invention.

Figure 9A:
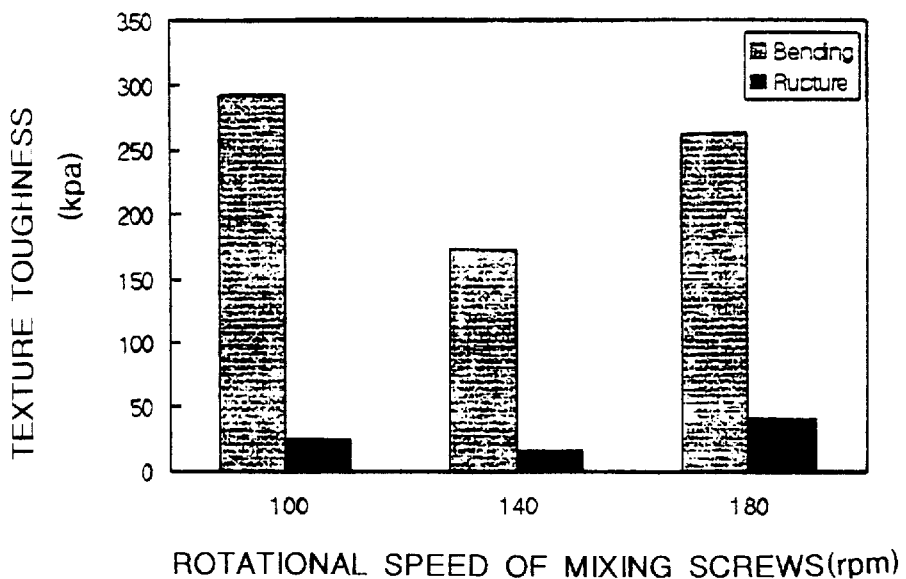
FIG. 9a is a graph showing the texture toughness of the pastries produced by the apparatus and method of the present invention as a function of the rotational speed of extruder screws of the present invention.

That is, pores were uniformly distributed in the interior of the uncoated and sized pieces 32 and the hardening level was the lowest at the rotational speed of 140 rpm. Incidentally, the rupture strength was 24.16 kPa for the rotational speed of 100 rpm, 16.09 kPa for the rotational speed of 140 rpm, and 40.13 kPa for the rotational speed of 180 rpm. For the rotational speed of 140 rpm, the rupture strength of the present invention was the lowest. These test results are shown in the graph of FIG. 9a.

Figure 9B:
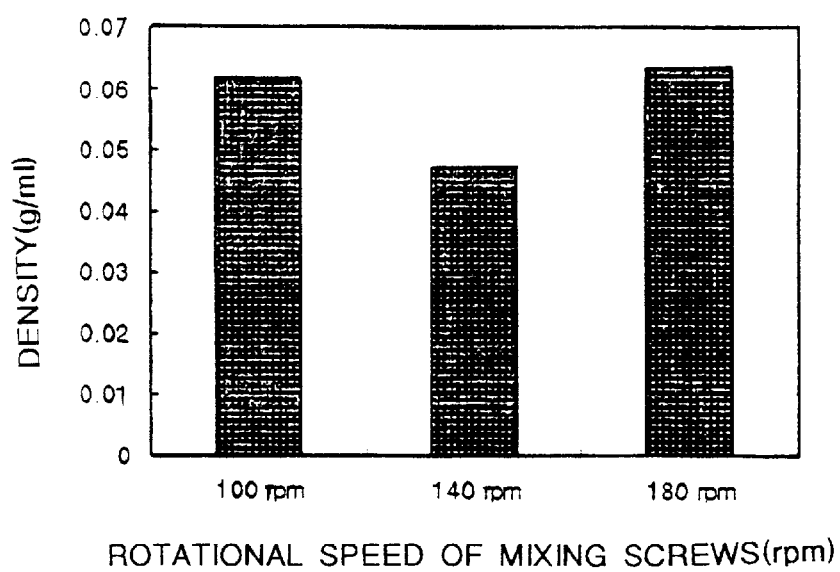
FIG. 9b is a graph showing the density of the pastries produced by the apparatus and method of the present invention as a function of the rotational speed of extruder screws of the present invention.

The fourth test for analyzing the influence on the density exerted by the rotational speed of the extruder screws was performed. In this test, the extruder screws were rotated at 100 rpm, 140 rpm, or 180 rpm while maintaining the interior temperature of the extruder at a constant point. The density was 0.06 g/ml for the rotational speed of 100 rpm, 0.05 g/ml for the rotational speed of 140 rpm, and 0.06 g/ml for the rotational speed of 180 rpm. In such a case, the density according to the present invention was the lowest when the rotational speed was 140 rpm. These test results are shown in the graph of FIG. 9b.

Accordingly, the present invention described above allows mass production of Korean oil pastries to be possible, while conserving the production time, reducing the production cost, sanitizing the production process, and improving the quality of production.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing Korean traditional oil pastries, comprising the steps of:

immersing glutinous rice in subterranean water for three days, washing said glutinous rice two or three times using flowing water, removing water partially from said glutinous rice so that a water content of said glutinous rice is 45–55 wt %, grinding said glutinous rice so as to obtain 80 mesh granules;

mixing said ground glutinous rice in an amount of 70–80 wt % with 10–15 wt % of bean flour, 10–15 wt % of powdered ginseng, 0.01 wt % of sugar, and 0.001 wt % of salt, thus forming a primary mixture, adding 1200–2000 cc of bean juice, 1200–200 cc of distilled liquor, and 10 cc of edible oil to said primary mixture, thus forming a secondary mixture, with the amounts of bean juice, distilled liquor, and edible oil being set on the basis of 8 kg of said ground glutinous rice;

kneading said secondary mixture with water so as to make a dough while being moved by two rows of mixing screws of an extruder, steaming said dough in a plurality of regularly spaced barrels positioned around said mixing screws, aerating said dough with $CO_2$ gas supplied at a pressure of 0.5–5 MPa from a gas tube connected between said barrels, forming an uncoated bar by extruding said dough with an extrusion die;

sprinkling said uncoated bar with flour supplied form a flour distributor, heating said bar by heaters while moving the bar by a conveyor belt, cutting said bar into a plurality of uncoated, sized pieces by a cutter positioned at a rear end of the conveyor belt, drying the cut pieces in a drier for 4–6 hours;

frying firstly the dried uncoated, sized pieces at a temperature of 110–120° C. for 1–2 minutes, frying again said pieces at a temperature of 160–180° C. for 2–4 minutes, removing oil from the pieces for 1–2 minutes, coating the pieces with grain syrup, and covering the pieces with at least one member selected from the group consisting of perilla seeds, black sesame seeds, sesame seeds, ground pine-nuts, pine pollen, powdered sea lettuce, powdered prawns and popped rice.

2. The method according to claim 1, wherein the ground glutinous rice in said mixing step is mixed in an amount of 80–95 wt % with 0.01 wt % of sugar, 0.001 wt % of salt, and at least one member selected from the group consisting of 5–20 wt % of powdered mugwort, 5–20 wt % of powdered green tea, 5–20 wt % of powdered polygonatum, and 5–20 wt % of powdered citron.

3. The method according to claim 1, wherein the ground glutinous rice in said mixing step is mixed in an amount of 80–90 wt % with 5–10 wt % of powdered prawns, 5–10 wt % of powdered red pepper, 0.01 wt % of sugar, and 0.001 wt % of salt.

4. An apparatus for manufacturing Korean traditional oil pastries, comprising:

an extruder including:
- a pair of mixing screws having different spiral angles;
- a speed reducer connected to said screws, said speed reducer being connected to a drive motor;
- a plurality of barrels arranged around said screws;
- an extrusion die mounted at a rear end of said extruder;
- a feed hopper provided with an outlet and a mixing hopper positioned above a front end of said extruder, said mixing hopper being positioned under said feed hopper outlet;
- a water supply hose positioned over said mixing hopper at;
- a $CO_2$ gas supply member connected to said extruder;

a conveyor unit including:
- a conveyor belt extending from a position under said extrusion die;
- a flour distributor positioned over a front end of said conveyor unit,
- a plurality of heaters arranged along said conveyer belt, and
- a cutter positioned at said conveyor unit.

5. The apparatus according to claim 4, wherein said $CO_2$ gas supply member includes a $CO_2$ gas tank, a cooler, a compressor, a blender, a gas valve, a pressure gauge, a check valve, and a flow meter arranged in order.

6. The apparatus according to claim 4, wherein said flour distributor includes:
- a flour distributing hopper;
- an agitator mounted in said hopper and used for stirring flour within the hopper;
- a roll brush mounted under said agitator and used for sweeping said flour out of said distributor; and
- a lower net mounted across a bottom of said distributor, said cutter being positioned at a rear end of said conveyor unit so as to cut a bar, sprinkled with flour and dried by said heaters, into a plurality of uncoated and sized pieces.

* * * * *